J. SWAN.
Making Auger Bits.

No. 80,027. Patented July 14, 1868.

Witnesses:
Wm A Morgan
G C Cotton

Inventor:
J. Swan
per Munn & Co
Attorneys

United States Patent Office.

JAMES SWAN, OF SEYMOUR, CONNECTICUT.

Letters Patent No. 80,027, dated July 14, 1868.

IMPROVEMENT IN THE MANUFACTURE OF AUGER-BITS.

*The Schedule referred to in these Letters Patent and making part of the same.*

TO ALL WHOM IT MAY CONCERN:

Be it known that I, JAMES SWAN, of Seymour, in the county of New Haven, and State of Connecticut, have invented a new and useful Improvement in the Manufacture of Spur-Auger Bits; and I do hereby declare that the following is a full, clear, and exact description thereof, which will enable those skilled in the art to make and use the same, reference being had to the accompanying drawings, forming part of this specification.

This invention relates to a new and useful improvement in the manufacture of spur-auger bits, and is designed to accomplish, by means of dies, what has hitherto been done by hand with skilled labor.

In the accompanying sheet of drawings—

Figure 1:

Figure 1 is a view of a bit-blank, constructed or formed in the usual way, and in a proper condition to be operated upon according to my invention.

Figure 2:
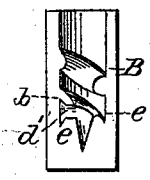

Figure 2, a view of one of a pair of dies, by which the first process of my invention is carried out or accomplished.

Figure 3:

Figure 3, a view of a bit after being operated by said dies.

Figure 4:

Figure 4, a view of one of a pair of dies by which the bit is completed.

Figure 5:

Figure 5, a view of a bit completed according to my invention.

Similar letters of reference indicate corresponding parts.

A represents a bit-blank, which is "crimped" or twisted and upset at the end, in order to have a sufficiency of metal at that part for the proper formation of the lips, spurs, and screw.

This is accomplished by the ordinary process of manufacture, and hitherto the point $a$, lips $b$ $b$, and spurs $c$ $c$, have been formed by hand and by skilled workmen, who, with peculiarly-shaped tools and many blows of a hand-hammer of peculiar construction, form in a crude manner the parts above specified.

I accomplish this result by means of two dies, one of which, B, is shown in fig. 2, an ordinary drop-press being used.

This die is formed with recesses or cavities $e$ $e$, which preserve the material of which the spurs are formed. Cavities $b$ $d'$ are also formed, which leave the blank, when pressed with the lip $b$ and cutting-edge, between said lip and the screw-point $a$, as shown in fig. 3.

These dies, in forming the parts above named, leave a "flash," $d$, all around them, (see fig. 3,) and this is removed by dies, one of which, C, the female one, is shown in fig. 4.

After the removal of the "flash," the finishing is done in the usual or any proper way.

The bit, with the "flash" removed, is shown in fig. 5.

The advantage of this improvement consists in the accurate and uniform work produced, which cannot be equalled by the ordinary hand process.

I do not claim forming the screw-lips and spurs of auger-bits by means of dies and a drop-press, but what I claim as new, and desire to secure by Letters Patent, is—

1. As my improvement of the dies B and C, the cavities $e$ $e$, for preserving the material for the spurs $c$ $c$, as described.

2. As my improvement in auger-blanks, the projecting portions $b$ $c$ $d'$, of metal, of which to form the lip and spur, of the form, and arranged relative to the screw-point and cutting-bit, as described.

JAMES SWAN.

Witnesses:
CHAS. DOUGLASS,
EDMUND H. KNIGHT.